3,709,848
HIGH TEMPERATURE CURE SYSTEMS FOR ETHYLENE PROPYLENE DIENE MONOMERS
Jeffrey M. Gerstin, Edison, and John T. Kehn, Roselle, N.J., assignors to Esso Research and Engineering Company
Continuation of abandoned application Ser. No. 689,829, Dec. 12, 1967. This application Jan. 29, 1971, Ser. No. 111,093
Int. Cl. C08f 29/12, 29/22; C08g 37/20
U.S. Cl. 260—19 UA                    10 Claims

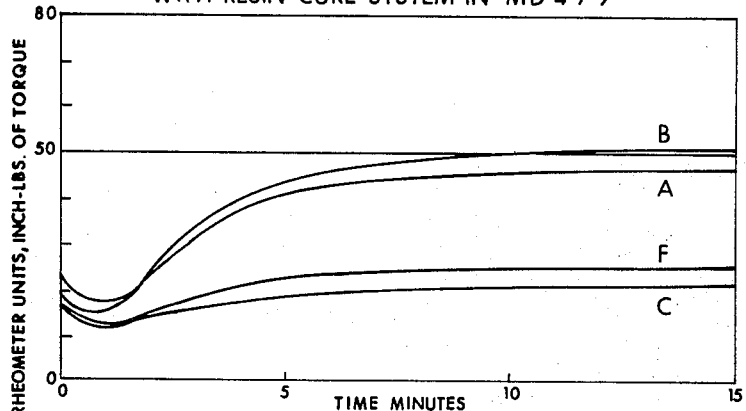
FIG.-1a ACCELERATING EFFECT OF HYPALON 40 WITH RESIN CURE SYSTEM IN MD 479
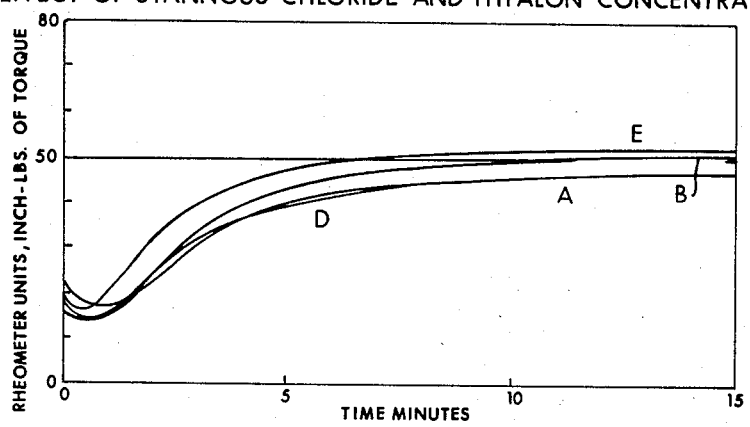
FIG.-1b EFFECT OF STANNOUS CHLORIDE AND HYPALON CONCENTRATION
| Componet | A | B | C | D | E | F |
|---|---|---|---|---|---|---|
| VISTALON 3509 | 100 | - | → | → | → | → |
| MD 479 | - | 100 | → | → | → | → |
| FEF BLACK | 100 | → | → | → | → | → |
| SRF BLACK | 100 | → | → | → | → | → |
| FLEXON 580 OIL | 100 | → | → | → | → | → |
| ZINC OXIDE | 5 | → | → | → | → | → |
| STEARIC ACID | 1 | → | → | → | → | → |
| SP 1055 RESIN | 12 | 18 | 12 | 18 | 18 | 18 |
| HYPALON 40 | - | 10 | - | 7.5 | 10 | - |
| STANNOUS CHLORIDE | - | - | - | - | 3 | - |
Jeffrey M. Gerstin
John T. Kehn    Inventors
By Jack Matalon
Patent Attorney United States Patent Office 3,709,848
Patented Jan. 9, 1973

ABSTRACT OF THE DISCLOSURE

Ethylene propylene diene monomers are cured using phenolic resins and a halogen containing polymeric cure activator.

---

This application is continuation of Ser. No. 689,829, filed Dec. 12, 1967, now abandoned.

BACKGROUND OF INVENTION

It has long been known that certain polymers may be cured using phenol aldehyde resins. For example, butyl rubber may be cured using a condensation polymer of p-alkyl phenol and formaldehyde, see U.S. Pat. 2,701,895 which is incorporated herein by reference. Similarly, phenol aldehyde resins have been used to cure styrene butadiene rubbers, see for example U.S. Pat. 2,708,192 incorporated herein by reference. It is known that improved resin cures of butyl rubber may be obtained by adding a cure activator such as a metal halide. Similarly, improved cures are obtained by using halomethyl hydrocarbon-substituted phenol aldehyde resins, see for example U.S. 3,093,163 and 3,165,496 which are incorporated herein by reference.

Resin cure systems are preferred over sulfur accelerated cures in that they result in products with better compression set, scorch and aging properties and result in vulcanizates which exhibit greater thermal stability. Such cures are particularly useful for injection molding, high temperature curing and applications requiring high modulus and low compression set. The excellent reversion resistance of resin cures makes them particularly suited for high temperature molding.

Certain ethylene propylene diene monomers (EPDM) are known to be cured by halomethyl hydrocarbon-substituted phenol aldehyde resins. For example, an EPDM containing methylene norbornene as the diene monomer has been successfully cured in this manner. It has not, however, heretofore been possible to accomplish satisfactory resin cures where, for example, the diene monomer is ethylidene norbornene.

SUMMARY OF THE INVENTION

It has now been found that surprisingly ethylidene norbornene containing EPDM may be resin cured in the presence of a cure accelerator where the cure accelerator is a halogen containing polymer. Preferably, the resin is a halomethyl hydrocarbon-substituted phenol aldehyde resin. For example, an ethylidene norbornene EPDM may be resin cured at high temperatures with about 12 phr. of a brominated phenol aldehyde resin and about 5 phr. of Hypalon, a chlorosulfonated polyethylene. An added advantage of this system is that rapid cures at moderate temperatures, i.e. 330° F., may be achieved.

DETAILED DESCRIPTION

This invention is directed toward the resin cure of ethylene propylene diene monomer (EPDM). In particular, ethylene propylene diene monomers wherein the diene monomer is ethylidene norbornene are advantageously cured by the method of this invention.

The term "EPDM" is used in the sense of its definition as found in ASTM D-1418–64 and is intended to mean a terpolymer containing ethylene and propylene in the backbone and a diene in the side chain. Illustrative methods for producing these terpolymers are found in U.S. Pat. 3,280,082, British Pat. 1,030,989 and French Pat. 1,386,600, which are incorporated herein by reference.

The preferred polymers contain about 45 to about 80 wt. percent ethylene and about 2.0 to about 10 wt. percent of a diene monomer, the balance of the polymer being propylene. Preferably, the polymer contains about 50 to about 60 wt. percent ethylene, e.g. 56 wt. percent, and about 2.6 to about 4.0 wt. percent diene monomer, e.g. 3.3 wt. percent.

The diene monomer is preferably a nonconjugated diene. Illustrative of these nonconjugated diene monomers which may be used in the terpolymer (EPDM) are hexadiene, dicyclopentadiene, ethylidene norbornene, methylene norbornene, propylidene norbornene and methyl tetrahydroindene. A typical EPDM is Vistalon 3509 (Enjay Chemical Co.) a polymer having a Mooney Viscosity at 212° F. of about 90, prepared from a monomer blend having an ethylene content of about 56 wt. percent and a nonconjugated diene content (methylene norbornene) of about 2.6 wt. percent. Typical of an EPDM containing ethylidene norbornene as the diene monomer is MD-479 (Enjay Chemical Co.), a polymer having a Mooney Viscosity at 260° F. of about 62 and an ethylene content of about 56 wt. percent.

Methylene norbornene based EPDMs are readily resin cured. Other alkylidene norbornenes, on the other hand, cannot be cured by the use of resin alone. The general formula for the alkylidene norbornenes of this invention is:

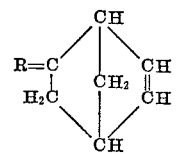

where R is an alkylidene radical such as methylene, ethylidene or propylidene. Though the higher alkylidenes, e.g. ethylidene, cannot be cured by the use of a resin alone, they may be cured by the addition of a halogen containing polymeric cure activator.

Not wishing to be bound by the theory, it is thought that in attempting conventional resin cures of the higher alkylidene norbornenes (i.e. R>CH$_2$) the double bond shifts away from the ring out into the alkyl chain, resulting in a tautomerisation to the alkylene norbornene (i.e. ethylidene norbornene⇌vinyl norbornene) which is less reactive than the alkylidene norbornene. The presence of the halogenated polymeric cure activator is thought to, in part, inhibit this tautomerism and also to activate the resin cure sufficiently to cure these less reactive isomers. Other EPDM's containing monomers in which the tautomerisation to a less reactive alkylene state cannot occur, e.g. dicyclopentadiene and tetrahydroindene, are readily cured by the cure systems of this invention.

The term "phenol-aldehyde resin" as used in the specification and claims is intended to include both monocyclic and polycyclic phenol dialcohols prepared from a para-alkyl-phenol and formaldehyde in the presence of alkali as shown by Honel in U.S. Pat. 1,996,069 or Charlton et al., in U.S. Pat. 2,364,192 and others, and by modifications which are well known to the art. Such phenol dialcohols are more fully described in U.S. Pat. 2,701,895 which is incorporated herein by reference.

The term "halogenated phenol-aldehyde resins" as used in the specification and claims is intended to mean both monomeric and polymeric halomethyl hydrocarbon-substituted phenols. The monomeric form of these curing agents falls under the general formula:

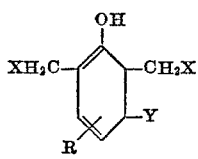

wherein R is an alkyl, aryl, or alkenyl hydrocarbon containing 4 to 16 carbon atoms located in the meta or para position (4–5 position); X is a halogen such as fluorine, chlorine, bromine or iodine; and Y is hydrogen or hydroxy.

Products obtained by the controlled halogenation of methylol containing resins prepared by the condensation of an aldehyde, e.g. formaldehyde with the following representative phenols: 4 - tertiary - butyl phenol, 4-phenyl phenol, and 4-monoxy phenol are within the purview of the halogenated phenol aldehyde resins suitable for use in this invention. These halomethyl hydrocarbon-substituted phenol compounds and their preparation are more fully described in U.S. Pats. 3,093,613 and 3,165,496 which are incorporated herein by reference.

The halogen containing polymeric cure activators suitable for use in the practice of this invention are any halogenated polymers. Illustrative of these halogen containing polymeric cure activators are chlorinated butyl rubber, brominated butyl rubber, chlorinated ethylene propylene rubber, chlorinated EPDM, chlorinated polyethylene, chlorosulfonated polyethylene (e.g. Hypalon, see Introduction to Rubber Technology, ch. 14, Morton, Reinhold, 1959, incorporated herein by reference), polyvinyl chloride and neoprene rubber.

Neoprene rubbers are described in a text entitled The Neoprenes by Murray and Thompson; DuPont, March 1963, which is incorporated herein by reference.

The expression "butyl rubber" as employed in the specification and claims is intended to include copolymers made from a polymerization reactant mixture having therein about 70–99.5% by weight of an isoolefin which has about 4–7 carbon atoms and about 30–0.5% by weight of a conjugated multiolefin having 4–14 carbon atoms. The resulting copolymer contains 85–99.5% of combined isoolefin and 0.5 to about 15% of combined multiolefin. The term "butyl rubber" is described in an article by R. M. Thomas et al. in Industrial Engineering and Chemistry, vol. 32, pp. 1283 et seq., October 1940.

A typical method of halogenating butyl rubber is to form a solution containing between about 1 to about 60% by weight of butyl rubber in an organic solvent such as hexane and to contact this butyl rubber cement with halogen gas for a period of about 25 minutes whereby halogenated butyl rubber and hydrogen halide are formed, the copolymer containing up to 1 atom of halogen per double bond in the copolymer. The preparation of halogenated butyl rubber is described in U.S. Pat. 3,099,644, which is incorporated herein by reference.

Illustrative of the phenol aldehyde resins which may be used in the practice of this invention is Amberol ST-137, a heat reactive phenol formaldehyde resin believed to be the reaction product of 1 mole of p-octylphenol, 2 moles of formaldehyde and 1 mole of sodium hydroxide, the alkali being carefully neutralized after the condensation is complete. It is a resinous solid.

Illustrative of the halogenated phenol aldehyde resins which may be used in the practice of this invention are Schenectady Chemicals Incorporated resins SP 1055 and SP 1056. Both resins are heat reactive bromomethyl alkylated pehnolic resins with a melting point of 135° C. The SP 1055 resin has a methylol content of about 11.25% and a bromine content of about 4.0%, whereas the SP 1056 resin has a methylol content of about 10 to 12.5% and a minimum bromine content of 6.0%.

The phenol aldehyde or halogenated phenol aldehyde resin is utilized in the EPDM composition at about 5 to about 25 parts per hundred parts of EPDM (phr.) preferably about 10 to about 20 phr., more preferably at about 12 to about 18 phr. Preferably, where the phenol aldehyde resin is not halogenated, a metal halide, e.g. ferric chloride, stannous chloride, stannous bromide, is incorporated into the composition at about 1 to about 8 phr., preferably 2 to about 6 phr., more preferably about 3 to about 4 phr.

The halogen containing polymeric cure activator is incorporated in the composition at about 2 to about 20 phr., based on the EPDM, preferably about 5 to about 15 phr., e.g. 10 phr., based on the EPDM.

The resin curing of these EPDM/halogen containing polymeric activator systems is accomplished at a temperature in excess of 280° F., preferably about 300° F. to about 500° F., more preferably about 330° F. to about 450° F., e.g. 440° F. Throughout this specification the term "Monsanto Rheometer" means the Monsanto oscillating-disk rheometer, Model LSD. The device is a useful tool in measuring cure rates and degree of cure.

The mechanical portion of the Rheometer consists of a biconical oscillating disk. The disk is imbedded in an elastomeric specimen contained in a rectangular cavity having dimensions of about 0.4 x 2 x 2 inches. The cavity and sample are heated electrically under a pressure of about 2500 p.s.i.

The disk is oscillated sinusoidally through a total amplitude of about 2 to 10 degrees at a frequency of about 15 cycles per second. The shaft of the disk is connected to a torque transducer consisting of 4 strain gauges used in a wheatstone bridge configuration and bonded to the lever which connects the disk to its drive mechanism.

The amplitude of the output of the bridge circuit is directly proportional to stiffness and is recorded as a continous record of the complex dynamic shear modulus. The time period for a complete run beginning immediately after preheating of sample is fifteen minutes. A more complete description of the Monsanto Rheometer and its uses may be found in an article authored by R. W. Wise and G. E. Decker entitled The Uses of an Oscillating-Disk Rheometer for Determining the Rheological Properties of Elastomers During Vulcanization, published in ASTM Special Technical Bulletin No. 383, Continuous Measurement of the Cure Rate of Rubber, p. 51, 1965.

The following examples illustrate how the process of this invention may be carried out as well as the benefits derived from its use.

Example 1

A blend was prepared of a methylene norbornene containing EPDM (Vistalon 3509, Enjay Chemical Co.) with various compounding agents using a brominated phenol aldehyde resin (SP 1055) as the curing agent. Similar blends were prepared using an ethylidene norbornene containing EPDM. In addition to the brominated phenol aldehyde resin as the curing agent, Hypalon 40 (a DuPont chlorosulfonated polyethylene containing about 34.5% chlorine, about 0.9% sulfur and having a Mooney Viscosity of 55 at 212° F.) and stannous chloride were used as cure activators. The samples were blended in a conventional fashion in a Banbury mixer for about 3–4 minutes at 250°–260° F.

The details of the compositions and the physical properties of the cured samples are shown in Table I. Press pads were prepared in a compression molding press at 320° F. and 1500 p.s.i.

TABLE I.—EFFECT OF HYPALON 40 ON CURE RATE AND ULTIMATE PROPERTIES

|  | A | B | C | D | E | F |
|---|---|---|---|---|---|---|
| Component: |  |  |  |  |  |  |
| Vistalon 3509 (MNB) | 100 |  |  |  |  |  |
| MD 479 (ENB) |  | 100 | 100 | 100 | 100 | 100 |
| FEF Black | 100 | 100 | 100 | 100 | 100 | 100 |
| SRF black | 100 | 100 | 100 | 100 | 100 | 100 |
| Flexon 580 oil [1] | 100 | 100 | 100 | 100 | 100 | 100 |
| Zinc oxide | 5 | 5 | 5 | 5 | 5 | 5 |
| Stearic acid | 1 | 1 | 1 | 1 | 1 | 1 |
| SP 1055 resin | 12 | 18 | 12 | 18 | 18 | 18 |
| Hypalon 40 |  | 10 |  | 7.5 | 10 |  |
| Stannous chloride |  |  |  |  | 3 |  |
| Mooney scorch at 270° F., minutes to 3 point rise above minimum | 18 | 15 | +30 | 17 | 7.5 |  |
| Cured 20 minutes at 320° F.: |  |  |  |  |  |  |
| Shore A Hardness | 70 | 76 | 60 | 75 | 80 |  |
| 100% modulus, p.s.i | 370 | 450 | 150 | 370 | 600 |  |
| 300% modulus, p.s.i | 550 | 820 | 170 | 749 | 1,130 |  |
| Tensile strength, p.s.i | 550 | 920 | 170 | 850 | 1,130 |  |
| Elongation, percent | 350 | 380 | 520 | 410 | 300 |  |
| Cured 30 minutes at 320° F.: |  |  |  |  |  |  |
| Shore A Hardness | 72 | 80 | 65 | 77 | 83 |  |
| 100% modulus, p.s.i | 450 | 550 | 180 | 460 | 670 |  |
| 300% modulus, p.s.i | 900 | 1,040 | 250 | 960 |  |  |
| Tensile strength, p.s.i | 900 | 1,040 | 250 | 1,050 | 1,200 |  |
| Elongation, percent | 300 | 310 | 500 | 350 | 260 |  |
| Compression set B, 22 hours at 212° F.; cured 25 minutes at 320° F | 87 | 82 | 95 | 85 | 73 |  |

[1] Naphthenic process oil (ASTM type 103) having a viscosity of 82 SUS at 210° F. and containing about 50% saturates.

It is readily evident from these data brominated phenol aldehyde resin alone will not cure an ethylidene norbornene containing EPDM. The addition of a halogen containing polymer (Hypalon 40) results in cures which are more rapid and achieve a higher ultimate strength than those achieved in the methylene norbornene containing EPDM. The presence of stannous chloride accelerates the cure and results in improved tensile and compression set properties. It is readily evident that the addition of a halogen containing polymer to the methylene norbornene EPDM/resin system will result in more rapid improved cures.

Data obtained on these same samples using the Monsanto rheometer are shown in FIGS. Ia and Ib. These rheograms were obtained on the LSD rheometer with a rotor frequency of 15 cycles per second and a stock temperature of 440° F. A preheat cycle of 30 seconds was used. Curve A of FIG. 1a shows the control sample (methylene norbornene EPDM) cured using 12 phr. of SP 1055. Curve C shows the identical composition where the polymer is an ethylidene norbornene containing EPDM.

The torque as given in rheometer units gives a comparison of the degree of cure, the higher value being equivalent to a higher cure. The initial slope of the curve is a measure of the rate of cure, the greater slope being proportional to a more rapid rate of cure.

Curve B shows the result of increasing the brominated phenol aldehyde resin content from 12 to 18 phr. and including as a cure activator Hypalon 40 at 10 phr. The composition represented by Curve F contains no Hypalon 40 but is otherwise identical to the composition B. Hence, it is evident thta the improved cure is a result of including the Hypalon 40 and not merely increasing the resin content.

Curve D of FIG. Ia shows that a composition containing 18 phr. of SP 1055 and 7.5 phr. of Hypalon 40 in an ethylidene norbornene EPDM results in a cure equivalent to that achieved by 12 phr. SP 1055 in a methylene norbornene EPDM.

The effect of the addition of a metal halide is shown by Curve E which corresponds to composition E of Example 1. Where the composition contains no metal halide but about 7.5 phr. of halogen containing polymer (Hypalon 40) and 18 phr. of brominated phenol aldehyde resin (Curve D), the cure is equivalent to the control data (Curve A, composition A, Example 1), Curve B, FIG. Ib corresponds to Curve B, FIG. Ia and composition B of Example 1.

Example 2

The compositions of Example 1 were injection molded at 440° F. in a Lewis 200 V injection molding machine under the following conditions:

| Barrel temperature | ° F | 200 |
|---|---|---|
| Injection time | seconds | 7 |
| Injection pressure | p.s.i | 1000 |
| Mold temperature | ° F | 440 |
| Nozzle diameter | inch | 3/8 |

The part obtained was a 0.075 inch thick 2½ x 6" tensile pad. Test specimens were cut from the pad and the modulus, hardness and tensile strength of the specimen was determined. These data are tabulated in Table II.

TABLE II.—INJECTION MOLDING OF RESIN CURED EPDM

|  | A | B | C | D | E |
|---|---|---|---|---|---|
| Component: |  |  |  |  |  |
| Vistalon 3509 (MNB) | 100 |  |  |  |  |
| MD 479 (ENB) |  | 100 | 100 | 100 | 100 |
| FEF black | 100 | 100 | 100 | 100 | 100 |
| SRF black | 100 | 100 | 100 | 100 | 100 |
| Flexon 580 oil | 100 | 100 | 100 | 100 | 100 |
| Zinc oxide | 5 | 5 | 5 | 5 | 5 |
| Stearic acid | 1 | 1 | 1 | 1 | 1 |
| SP 1055 resin | 12 | 18 | 12 | 18 | 18 |
| Hypalon 40 |  | 10 |  | 7.5 | 10 |
| Stannous chloride |  |  |  |  | 3 |
| Cured 45 seconds at 440° F.: |  |  |  |  |  |
| Shore A hardness | 66 | 75 | (¹) | 71 | 75 |
| 100% modulus, p.s.i | 300 | 400 | (¹) | 350 | 460 |
| 300% modulus, p.s.i | 570 | 860 | (¹) | 760 | 1,020 |
| Tensile strength, p.s.i | 600 | 900 | (¹) | 830 | 290 |
| Elongation, percent | 400 | 330 |  | 370 |  |
| Compression set B, 22 hours at 212° F. (plied pads) | 80 | 70 |  | 81 | 53 |
| Cured 60 seconds at 440° F.: |  |  |  |  |  |
| Shore A hardness | 68 | 76 | (¹) | 74 | 77 |
| 100% modulus, p.s.i | 360 | 460 | (¹) | 410 | 550 |
| 300% modulus, p.s.i | 780 | 990 | (¹) | 880 |  |
| Tensile strength, p.s.i | 890 | 990 | (¹) | 940 | 1,160 |
| Elongation, percent | 370 | 300 | (¹) | 340 | 250 |
| Compression set B, 22 hours at 212° F. (plied pads) | 69 | 58 |  | 68 | 4 2 |

¹ Did not cure.

It is readily evident that without the halogen containing polymer, i.e. Hypalon 40, a resin cure of an adequate ethylidene norbornene containing EPDM cannot be achieved. Not only are the final cure properties of an ethylidene norbornene EPDM when cured using a halogenated polymeric activator equivalent to that of resin cure of a methylene norbornene EPDM; the cure rate in the former composition is more rapid.

Example 3

Various samples were prepared in the manner of Example 1 using 5 phr. Hypalon 40, varying levels of brominated phenol aldehyde resins containing different amounts of bromine. These compositions are shown in Table III. These compositions were prepared from a base blend having the following composition:

| Component: | Parts by weight |
|---|---|
| Polymer (as shown) | 100 |
| Zinc oxide | 5 |
| Stearic acid | 1 |
| FEF black | 100 |
| SRF black | 100 |
| Flexon 580 | 100 |

The Hypalon 40 and resin content are shown in the table in parts per hundred parts polymer.

TABLE III.—RESIN CURE OF EPDM

| Component: | O | A | B | C | D | E | F | G |
|---|---|---|---|---|---|---|---|---|
| EPDM | (¹) | MD 479 | MD 479 | MD 479 | MD 479 | MD 479 | MD 479 | MD 479 |
| Hypalon 40 | | | | | 5 | 5 | 5 | 5 |
| SP 1055 resin | 12 | 12 | 15 | 18 | 12 | 15 | 18 | |
| SP 1056 resin | | | | | | | | 12 |
| Mooney scorch, MS-270° F.; minutes to 3 pt. rise | 12.5 | +30 | +30 | +30 | 21 | 15 | 15 | 8.5 |
| Mooney plasticity, ML-212° F.; 1 plus 8 minutes reading | 61 | 47 | 46 | 46.5 | 51.5 | 52 | 49.5 | 57.5 |
| Original physical properties cure 20'/320° F. (press): | | | | | | | | |
| Hardness, Shore A | 72 | 63 | 63 | 66 | 71 | 74 | 75 | 57 |
| 100% modulus, p.s.i | 435 | 165 | 215 | 250 | 300 | 420 | 440 | 470 |
| 200% modulus, p.s.i | 700 | 170 | 280 | 375 | 480 | 700 | 760 | 780 |
| 300% modulus, p.s.i | 870 | 180 | 315 | 450 | 570 | 850 | 975 | |
| Tensile strength, p.s.i | 870 | 180 | 315 | 450 | 600 | 910 | 1,010 | 1,025 |
| Elongation, percent | 305 | 325 | 360 | 365 | 405 | 350 | 330 | 285 |
| Air aged 70 hours at 300° F., cured 20'/320° F. (press): | | | | | | | | |
| Hardness change, pts | +19 | +28 | +28 | +27 | +24 | +21 | +20 | +18 |
| Tensile retained, percent | 160 | 445 | 300 | 230 | 195 | 130 | 135 | 120 |
| Elongation retained, percent | 46 | 32 | 17 | 23 | 26 | 26 | 27 | 40 |
| Compression set B, cured 25'/320° F.: | | | | | | | | |
| 22 hours at 212° F., percent | 66 | 89 | 85 | 82 | 74 | 72 | 72 | 58 |
| 70 hours at 212° F., percent | 82 | 99 | 96 | 93 | 88 | 82 | 80 | 70 |

¹ Vistalon 3509.

It is evident that although adequate cures are obtained with 5 phr. Hypalon 40 and 12 phr. of SP 1055 (4.0% bromine) Curve D, where the resin is 12 phr. SP 1056 (6.0% bromine) Curve G, cures are obtained which are superior to those obtainable with 18 phr. SP 1055 and 5 phr. Hypalon 40, Curve F.

Although the invention is described in terms of obtaining fully cured product, it is evident to those skilled in the art that a partial cure or heat treat will result in a product having higher green strength than the original polymer, these heat treated polymers being susceptible to further cures by conventional means or by the method of this invention.

In such a heat treatment, the phenol aldehyde or halogenated phenol aldehyde resin may be utilized at about 0.25 to about 5 phr. preferably about 1 to about 4 phr., e.g. 3 phr. The halogen containing cure activator may be incorporated at about 0.5 to about 5 phr.

Since many different embodiments of this invention may be made without departing from the spirit and scope thereof, it is to be understood that the present invention is not limited to the embodiments specifically disclosed in this specification.

What is claimed is:

1. A process for curing an EPDM wherein the diene monomer of the EPDM is ethylidene norbornene in an amount ranging from about 2.0 to about 10.0 wt. percent, consisting essentially of
   (a) adding to said EPDM about 5 to about 25 phr., based on the EPDM, of a heat reactive brominated phenol aldehyde resin;
   (b) adding to said EPDM about 2 to about 20 phr., based on the EPDM, of a halogen containing cure activator selected from the group consisting of chlorinated butyl rubber, brominated butyl rubber, polyvinyl chloride, chlorinated polyethylene, chlorosulfonated polyethylene, polychloroprene or mixtures thereof; and
   (c) curing said EPDM at a temperature in excess of 280° F.

2. The process of claim 1 wherein the resin is present at about 12 to 18 phr. and the polymeric cure activator is present at about 5 to about 15 phr.

3. The process of claim 1 wherein curing is accomplished at a temperature of about 330° F. to about 450° F.

4. The process of claim 1 wherein the polymeric cure activator is chlorinated butyl rubber, brominated butyl rubber or chlorosulfonated polyethylene.

5. A curable composition consisting essentially of:
   (a) 100 parts of an EPDM, wherein the diene monomer of the EPDM is ethylidene norbornene, present in an amount ranging from 2.0 to about 10.0 wt. percent;
   (b) about 2 to about 20 phr. based on the EPDM, of a halogen containing polymeric cure activator selected from the group consisting of chlorinated butyl rubber, brominated butyl rubber, polyvinyl chloride, chlorinated polyethylene, chlorosulfonated polyethylene, polychloroprene or mixtures thereof; and
   (c) about 5 to about 25 phr. based on the EPDM, of a heat reactive brominated phenol aldehyde resin;
   (d) carbon black;
   (e) a naphthenic process oil (ASTM type 103);
   (f) ZnO; and
   (g) stearic acid.

6. The composition of claim 5 wherein the resin is present at about 12 to 18 phr. and the polymeric cure activator is present at about 5 to about 15 phr.

7. The composition of claim 5 wherein the polymeric cure activator is chlorinated butyl rubber, brominated butyl rubber or chlorosulfonated polyethylene.

8. The composition of claim 5 wherein the brominated phenol aldehyde resin is a heat reactive bromomethyl alkylated phenolic resin having a melting point of about 135° C.

9. The composition of claim 8 wherein the methylol content of said resin is 11.25 wt. percent and the bromine content is 4.0 wt. percent.

10. The composition of claim 8 wherein the methylol content of said resin is about 10 to about 12.5 wt. percent and the bromine content is at least 6.0 wt. percent.

References Cited

UNITED STATES PATENTS 3,287,440   11/1966   Giller _____ 260—848
3,534,119   10/1970   Relyea _____ 260—848

FOREIGN PATENTS 987,827   3/1965   Great Britain _____ 260—848

JOHN C. BLEUTGE, Primary Examiner

U.S. Cl. X.R.

260—23.7 M, 33.6 AQ, 41.5 R, 845, 846, 847, 848, 889, 890, 897 C